United States Patent [19]

Beyers, Jr.

[11] 3,984,828

[45] Oct. 5, 1976

[54] CHARACTER GENERATOR FOR TELEVISION CHANNEL NUMBER DISPLAY WITH EDGING PROVISIONS

[75] Inventor: Billy Wesley Beyers, Jr., Greenfield, Ind.

[73] Assignee: RCA Corporation, New York, N.Y.

[22] Filed: May 23, 1975

[21] Appl. No.: 580,677

[52] U.S. Cl. .................. 340/324 AD; 178/DIG. 34

[51] Int. Cl.$^2$ .......................................... G06F 3/14

[58] Field of Search ............................ 340/324 AD; 178/DIG. 34, 7.3 D

[56] References Cited

UNITED STATES PATENTS 3,781,849 12/1973 Baron et al. ................ 340/324 AD

*Primary Examiner*—Marshall M. Curtis
*Attorney, Agent, or Firm*—Eugene M. Whitacre; Peter M. Emanuel

[57] ABSTRACT

Alphanumeric characters having borders of different color or brightness from the body of the characters are generated on a raster scan display device. Signals are generated for forming a first character having size equal to the character and borders. A second, smaller character is generated from the signals of the first, by appropriately blanking portions of the first character signals. The first and second character signals are arranged to produce centered, overlapping images of different colors or brightnesses on the display device.

6 Claims, 16 Drawing Figures

FIG. 2C
FIG. 2D
FIG. 2E
FIG. 2F
FIG. 2G
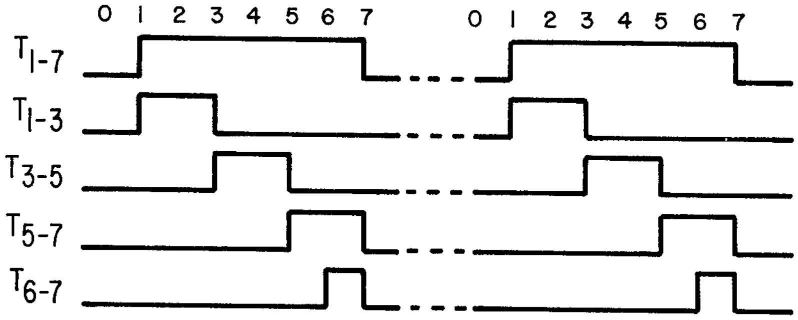
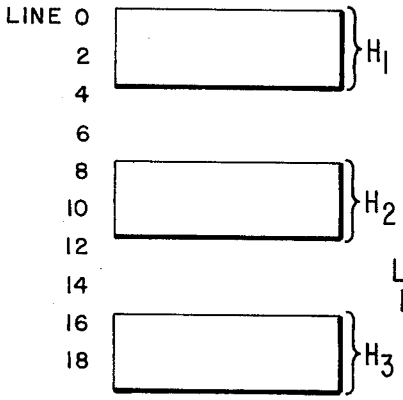
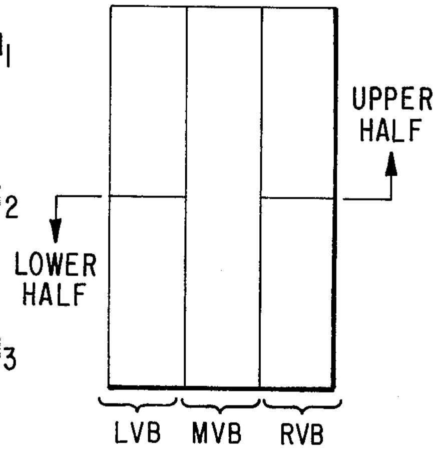
FIG. 2A FIG. 2B
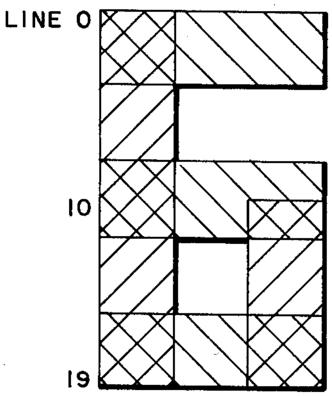
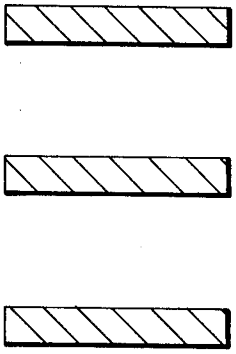
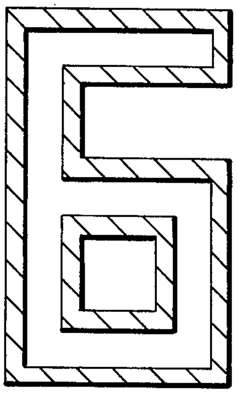
FIG. 3A FIG. 3C FIG. 3B
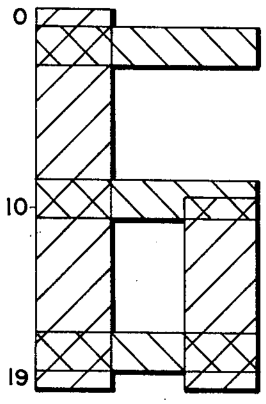
FIG. 3D
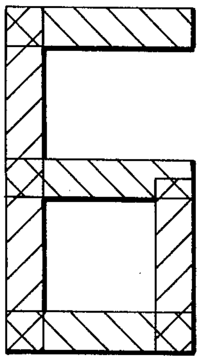
FIG. 3E

CHARACTER SEGMENT DECODER

VERTICAL SEGMENT DECODER

CHARACTER GENERATOR FOR TELEVISION CHANNEL NUMBER DISPLAY WITH EDGING PROVISIONS

This apparatus relates to generation of characters for display on a raster scan display device such as a television receiver and more particularly to generation of numeric characters having a border or outline enhancement.

In a television receiver, particularly of the remotely controlled variety, it is desirable to provide a display of the selected channel number. One approach that may be utilized involves displaying the selected channel number on the television receiver screen. Such a display may be subject to appearing washed out when the numerical character is generated in a region of the display having brightness and/or color similar to the displayed character.

An improved apparatus for generating characters having a surrounding border which contrasts either in color or brightness or both with the body of such characters comprises means for selectively generating signals to produce on a raster scanned display screen, three juxtaposed vertical bars having height and cumulative width respectively equal to the height and width of an individual character plus borders. A horizontal bar generating means further selectively generates signals to produce horizontal bars having length equal to the total width of the latter three vertical bars and being vertically displaced with spaces between each of these bars substantially equal to the width of a single horizontal bar. The three horizontal bars and spaces are arranged with a vertical height equal to the height of the three vertical bars. Means are provided for generating commands for selecting desired characters. Means responsive to the command signals selectively gates ones of the vertical and horizontal bar signals representative of a selected character. A delay means is coupled to the selective gate means and provides a delay corresponding to substantially two times the width of the desired border on the selected characters. A means is coupled to the selective gating means for blanking signals provided thereby representative of the horizontally disposed borders of these bars. A further gating means having inputs coupled to the delay means and to the blanking means provides signals responsive to the concurrent presence of signals at its associated inputs. A further delay means is coupled to the further gating means for providing a predetermined delay to the gated signals. Signals provided by the delay means reproduce an image in a first color. Signals provided by the further delay means reproduce an image in a second color. A means for combining signals provided by the delay means and the further delay means provides output signals representative of characters having a border of a first color and an interior portion of a second color.

A better understanding of this invention may be derived from the following description when taken with the drawing in which:

FIGS. 2A and 2B are representations of horizontal and vertical bars utilized for generating alphanumeric characters;

FIGS. 2C–2G are representations of waveforms generated in the apparatus of FIG. 1;

Figure 1:
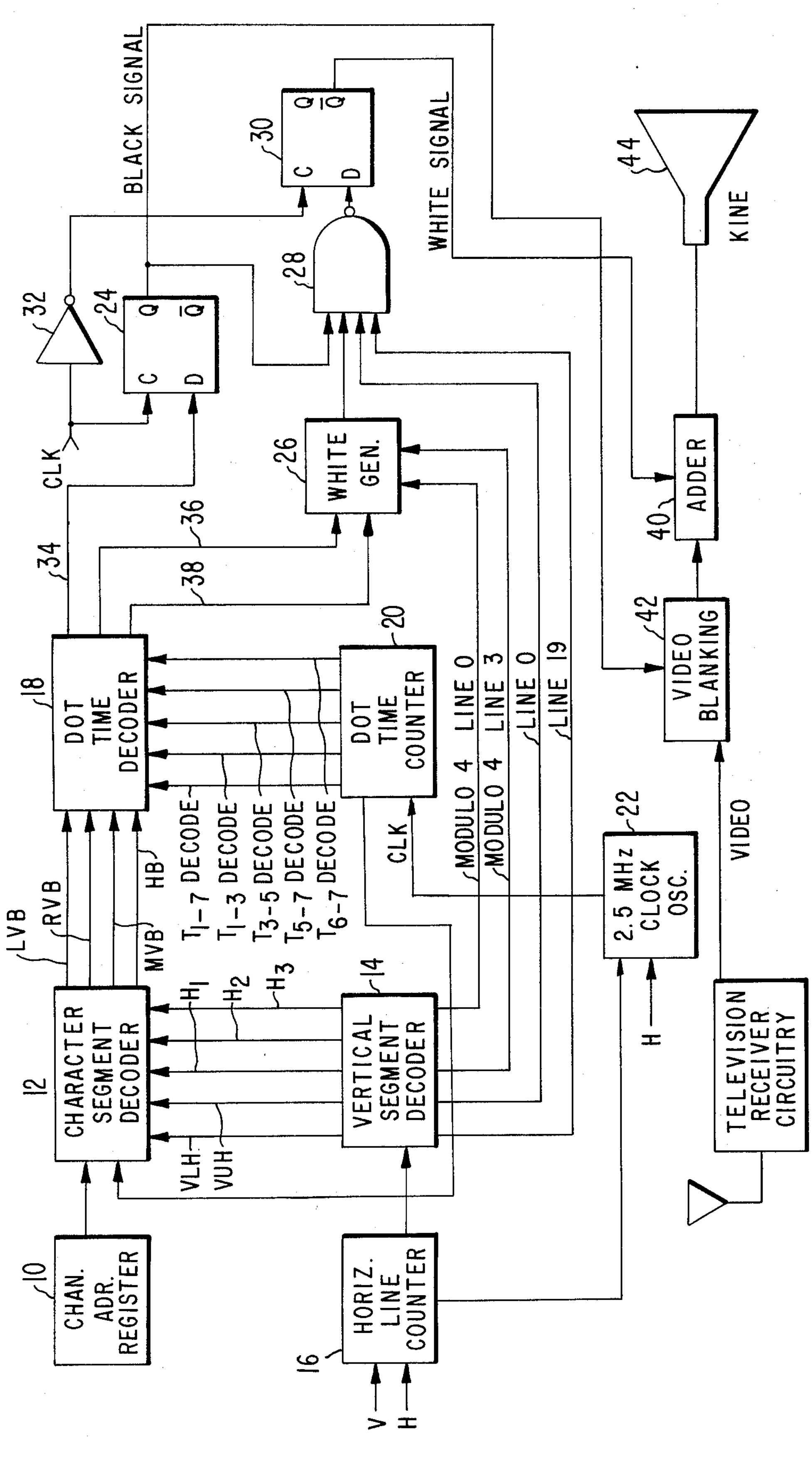
FIG. 1 is a block diagram of apparatus for generating alphanumeric characters having a border of color and/or brightness different from the remaining portion of the character in accordance with the present invention.
Figure 4:
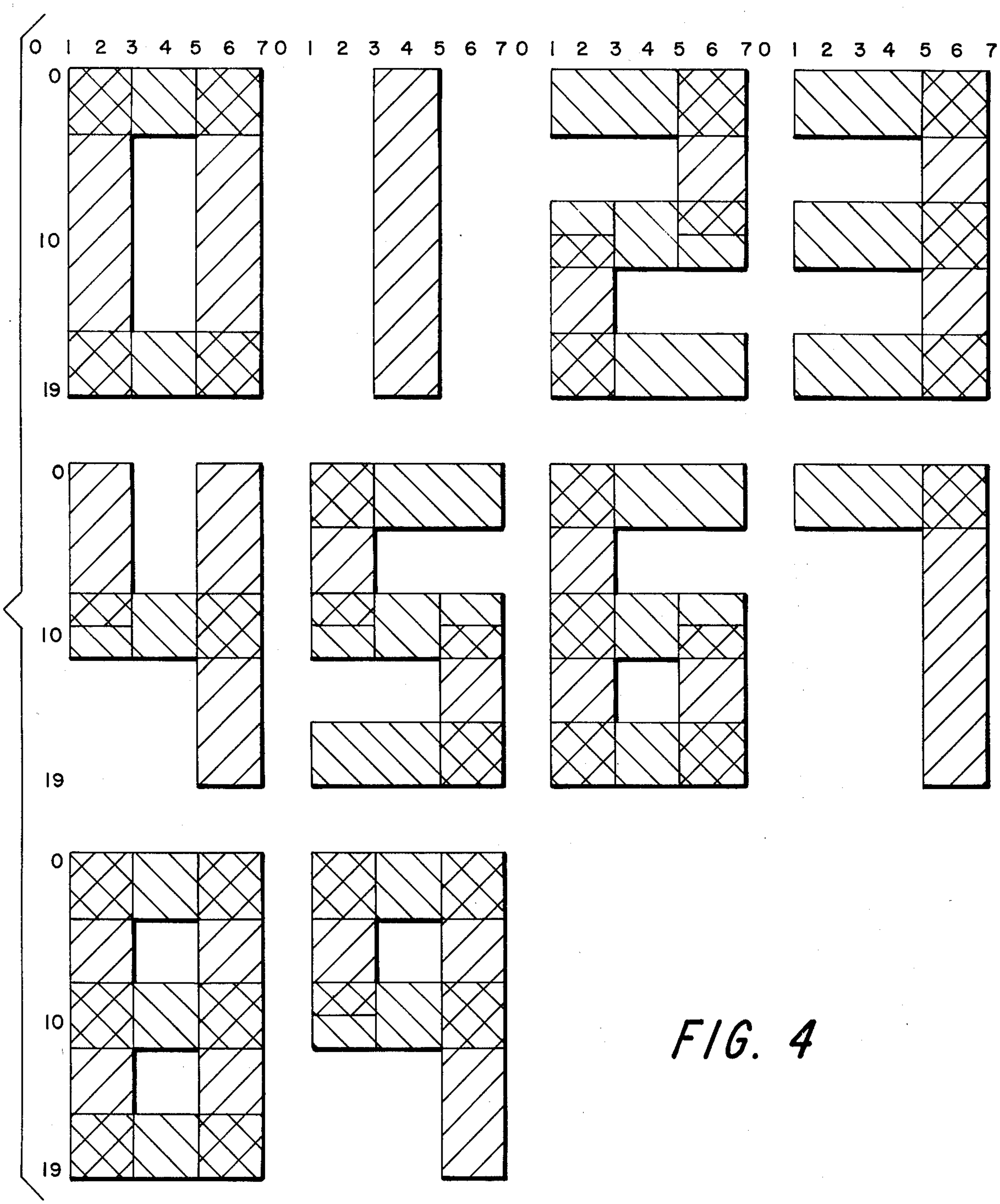
Figure 5:
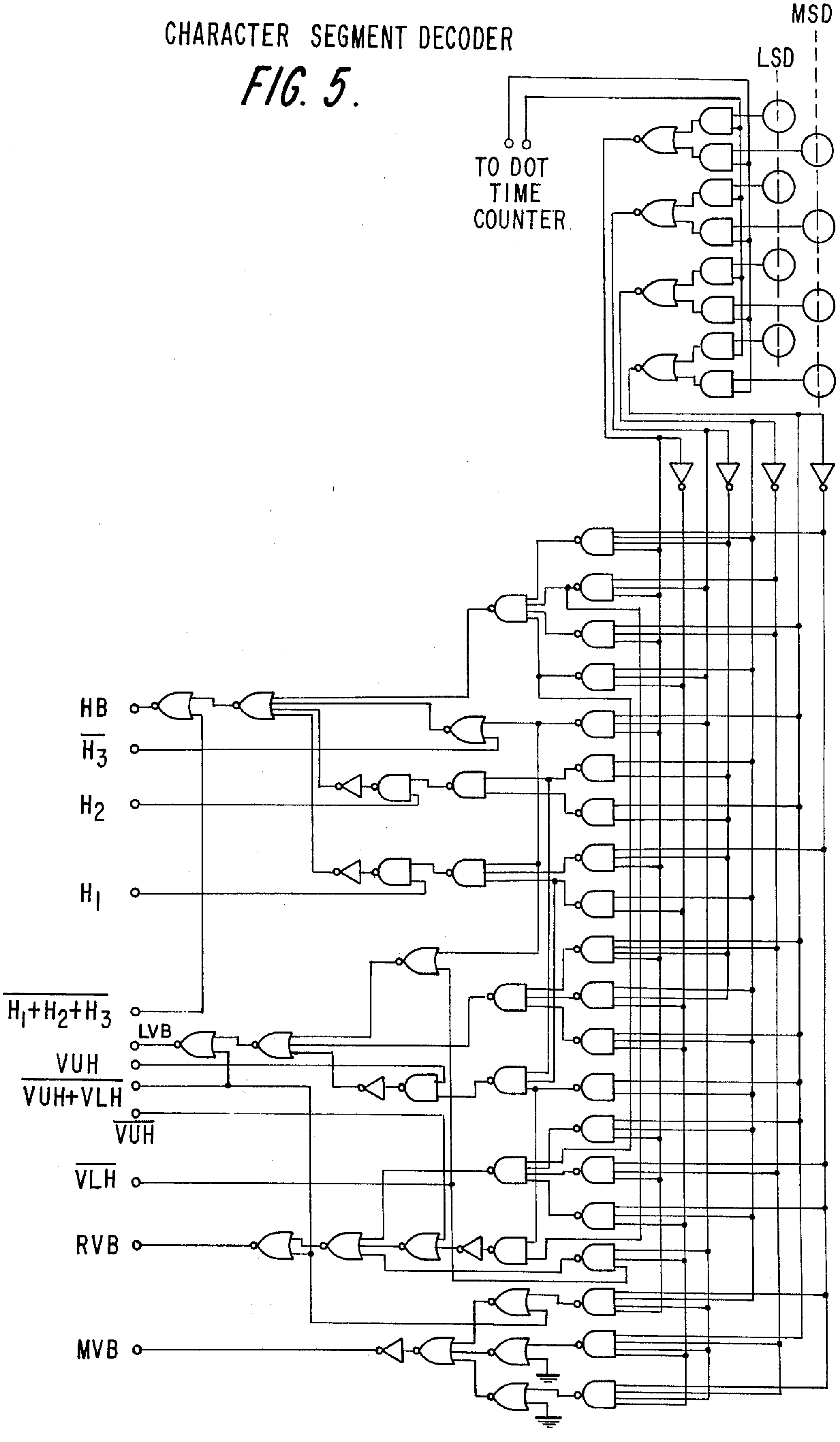
Figure 6:
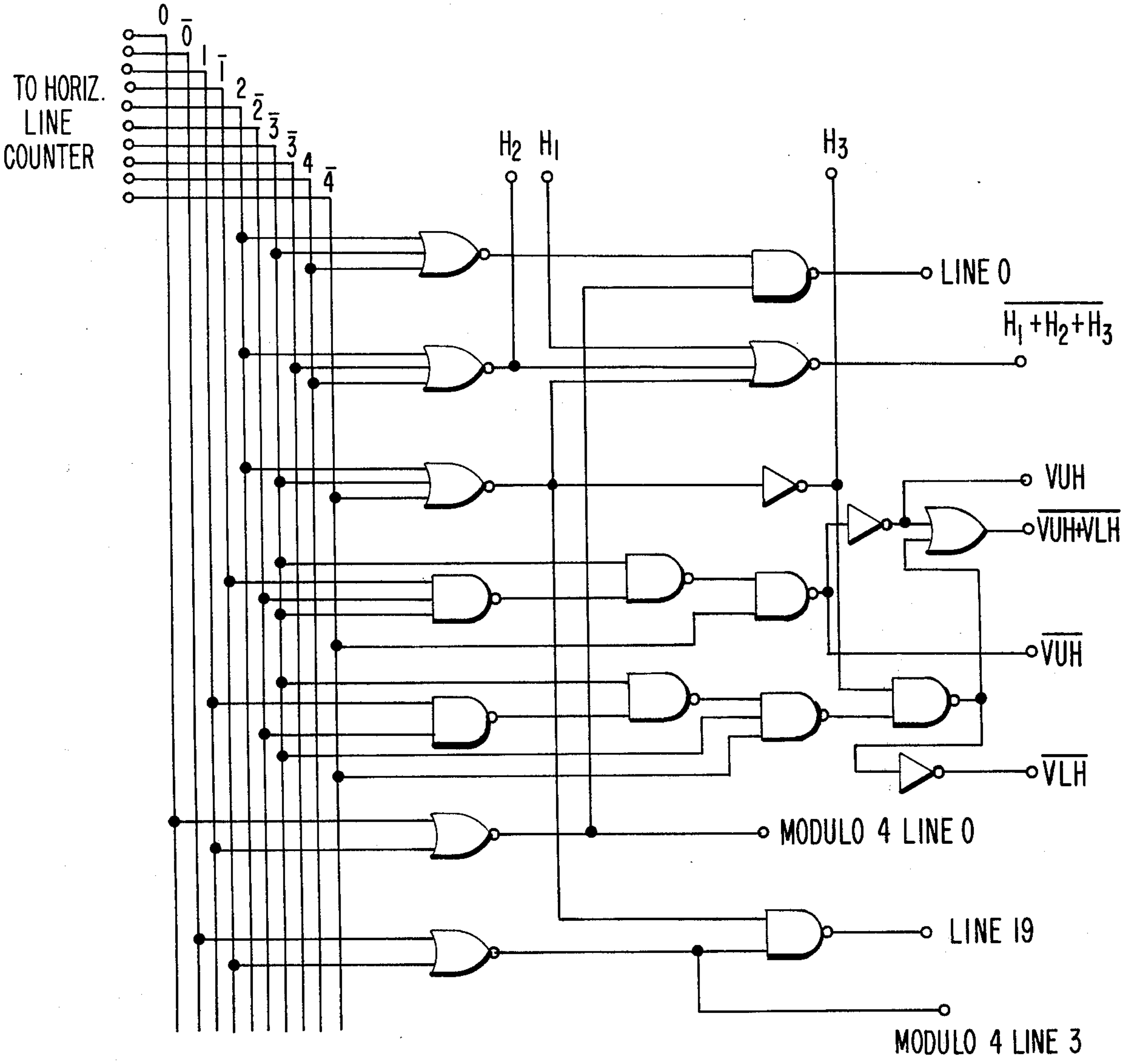

FIGS. 3A–3E correspond to various states of completion of the digit numeral 6 as generated by the apparatus of FIG. 1;

FIG. 4 indicates the general shape of the digits generated by the apparatus of FIG. 1;

FIG. 5 is a schematic diagram of a Character Segment Decoder suitable for use in the apparatus of FIG. 1; and FIG. 6 is a schematic diagram of a Vertical Segment Decoder suitable for use in the apparatus of FIG. 1.

With reference to FIG. 1, a channel address register 10 is coupled to a character segment decoder 12, wherein vertical and horizontal bar or segment-representative signals are generated. Decoder 12 further receives enabling signals from a dot-time counter 20 and an imagesegment-representative signal image-segment-representative a vertical segment decoder 14. Decoder 14 provides signals representative of the vertical height (number of horizontal scan lines) required for each of the vertical and horizontal bar segments in response to horizontal line count signals supplied from counter 16. Height-representative signals corresponding to the desired digit segments to be displayed are provided by decoder 12 to a dot-time decoder 18, which appropriately limits the horizontal time duration (width) of the decoder 12 signals so as to form the appropriate segment signals. Decoder 18 is controlled by means of a dot-time counter 20 which receives relatively high frequency clock signals from a clock oscillator 22 and couples horizontal timing signals to decoder 18. The image-segment-representative signals provided by dot-time decoder 18 are coupled to a flip-flop 24 and a white signal generator 26. Flip-flop 24 is arranged to delay signals by one clock time as will appear below. Generator 26 further receives appropriate blanking signals from decoder 14 and blanks portions of the signals provided by decoder 18 in the regions corresponding to the borders of the horizontal bar segments. Signals provided by generator 26 are coupled to a NAND gate 28 which also receives blanking signals from decoder 14 and output signals from flip-flop 24. Gated signals from NAND gate 28 are coupled to a flip-flop 30. Flip-flop 30 receives clock signals from oscillator 22 through an inverter 32 and provides a one-half clock-time delay to the applied signals. Signals provided by flip-flops 24 and 30 respectively represent a relatively larger character edging signal and a relatively smaller character-body-representative signal centered in time within the edging signal. Video signals provided by television receiver 41 are coupled to a blanking circuit 42 where they are blanked by the edging video signal. Character-representative and edging signals are added to the video line at an adder 40 for coupling to an image reproducing device such as a kinescope (kine) 44.

In the operation of the above-described apparatus, a viewer may select a desired channel by, for example, depressing an appropriate digit key on a directly wired keyboard or on a remote control transmitter. Alternatively, in a channel scanning or signal seeking arrangement, the associated tuner (not shown) may be sequenced through the available television channels. In any case, the particular channel number information corresponding to a selected channel or to one which is being addressed at a given instant is entered into channel address register 10. Thus, channel address register 10 provides signals corresponding to a selected television channel number. Register 10 provides either single or two-digit numbers corresponding to the selected channel number. Signals provided by register 10 are in the form, for example, of two four-bit binary coded decimal (BCD) signals generated on eight parallel output lines (shown as one). An input line to decoder 12 from counter 20 sequentially passed the most significant digit (MSD) of the selected channel number and then the least significant digit (LSD). For purposes of simplification, the remainder of the description will be confined to generation of a single character. Character segment decoder 12 is responsive to the BCD signals provided by register 10 and decodes or converts these signals to activate appropriate gating circuitry suitable for passing signals representative of the height (in terms of the number of horizontal scanning lines) of each of the horizontal and vertical segments required to construct the selected digit on an associated television screen. The segment-height-representative signals are coupled to the gating circuitry within segment decoder 12 by vertical segment decoder 14. Segment decoder 14 generates signals corresponding to the height of the horizontal bars shown in FIG. 2A and signals representative of the heights of the upper half and lower half of the vertical bars shown in FIG. 2B. Signals corresponding to the heights of the top, middle and lower horizontal bars of FIG. 2A are respectively provided by decoder 14 on output lines labelled $H_1$, $H_2$ and $H_3$. For example, as is shown in FIG. 2A, each of the horizontal bars has a height of four horizontal scanning lines, the bars being spaced apart by four scanning lines. Signals corresponding to the heights of the upper and lower halves of the vertical bars in FIG. 2B are respectively provided on output lines VUH and VLH. For example, as is shown in FIG. 2B, each half of a vertical bar extends over a height of ten horizontal scanning lines. Hence, when a particular BCD digit is coupled to decoder 12, gates within this decoder pass to appropriate output lines (LVB, RVB, etc.) signals during the horizontal line intervals selected by decoder 14 that are representative of the heights of the segments of the digit to be displayed. This operation will be described in greater detail below.

While there are many ways to construct character segment decoder 12 and vertical segment decoder 14 with standard logic circuitry, a suitable circuit for each of these blocks is respectively illustrated in FIGS. 5 and 6.

In order to display the selected digit in a preselected portion of the television screen, signals provided by clock oscillator 22 are inhibited by signals provided by counter 16 except during scanning of the preselected region, for example, horizontal scan lines 192–211.

Dot-time decoder 18 receives signals provided by decoder 12 and further gates these signals with signals provided by dot-time counter 20. Counter 20 provides signals representative of five different time intervals along a horizontal line corresponding to the position and width of desired horizontal and vertical bar signals (see waveforms in FIGS. 2C–2F). Illustratively, signals corresponding to the left vertical bar (LVB) are gated with the waveform $T_{1\text{-}3}$ of FIG. 2D. Signals corresponding to right vertical bar (RVB) are gated with the waveform $T_{5\text{-}7}$ shown in FIG. 2F. Similarly, the waveforms corresponding to the middle vertical bar (MVB) are gated with the waveform $T_{3\text{-}5}$ shown in FIG. 2E. The horizontal bars (HB) are gated with the waveform $T_{1\text{-}7}$ illustrated in FIG. 2C. By gating the particular signals provided by generator 12 with signals having the waveforms illustrated in FIGS. 2C–2F, the resultant characters generated are assured of having relatively uniform and stable leading and trailing edges. A relatively high stability is achieved in the gating signals produced by counter 20 by utilizing a relatively high frequency (e.g., 2.5 MHz) clock oscillator 22 that is synchronized with the horizontal scan frequency of the associated television receiver.

Character representative signals generated at the output of decoder 18 are coupled via line 34 to the D input of flip-flop 24. Flip-flop 24 also receives clock signals from oscillator 22 and provides a one clock-time delay (i.e., corresponding to half the width of a vertical bar) to the signals applied at the associated D input. The purpose of such delay will be explained below. The delayed signals provided by flip-flop 24 are coupled to blanking circuit 42 for blanking video signals generated by the television receiver. By blanking the television receiver video signal by means of the generated character signals, a black character is reproduced on the television kinescope. The generated characters formed by the signals from flip-flop 24 are shaped substantially as shown in FIG. 4.

A character having, for example, black edging and a non-black body may be formed by first forming a black character and then superimposing over such black character, the same character is a smaller size and different color or brightness. The smaller character is illustratively referred to as white in color but could be any non-black or contrasting color.

To this end, a white signal is generated from the above-derived black signal by appropriately inhibiting generation of edge protions of the black signal to form a second character having smaller size than the first character. The second smaller character is developed in part with the aid of white generator 26. Generator 26 receives signals from decoder 18 on lines 36 and 38. Signals on line 36 correspond to signal information representative of the horizontal bars $H_1$, $H_2$ and $H_3$ that have been gated with the $T_1 - T_7$ signal. Signals on line 38 correspond to vertical bars LVB gated with the $T_1 - T_3$ signal, MVB gated with the $T_3 - T_5$ signal and RVB gated with the $T_6 - T_7$ signal. Signals provided by line 36 are further gated in generator 26 with modulo 4, line 0 signals and modulo 4, line 3 signals. Modulo 4, line 0 signals correspond to blanking signals occurring every four horizontal scan lines starting with the number 0 line of character signal information; i.e., the top horizontal scan line of the character to be produced. Similarly, modulo 4, line 3 signals correspond to blanking signals starting on the third scan line of the character to be produced and repeat every four lines. The modulo 4 blanking signals repetitiously occur with each scan line beginning with the number 0 line of the digit and ending with the 19th line of the reproduced image. By blanking the zero and third lines, the top and bottom portions of each of the horizontal bars $H_1$, $H_2$ and $H_3$ becomes blanked forming resultant horizontal bars having a width of approximately two scan lines instead of four. The horizontal bar signals from line 36 that have been appropriately blanked by the modulo 4 signals are combined in generator 26 with the vertical bar signals provided on line 38 and the resultant is coupled to an input of gate 28. Gate 28 receives signals from flip-flop 24, generator 26 and decoder 14. Signals from decoder 14 operate to prevent an output from gate 28 for signals beginning on lines 0 and 19. By blanking the 0th line and 19th line, the resultant character will be assured of having a vertical height diminished by one scan line on the top and one on the bottom. Character representative signals provided to gate 28 from flip-flop 24 have a one clock-time delay eith with respect to signals provided by generator 26. As a result of this one clock-time delay, only the signals existing concurrently and not corresponding to the 0 or 19th line pass through gate 28. Hence, the resultant signals provided by gate 28 form an image that has a width that is diminished by one clock time. In order to effect a resultant image which appears to have a black border, it is necessary to provide centering of the reduced size image provided by the signals of gate 28 with respect to the black signal created from flip-flop 24. To provide such centering, a half clock-time delay is necessary. This half clock-time delay is derived by passing the signals from gate 28 through a D-type flip-flop 30 and clocking these signals with inverted clock signals. Clock signals from oscillator 22 are passed through an inverting gate 32 to provide the desired inverted clock signals. Polarity of the signals derived from flip-flop 30 is inverted by using the Q output of this flip-flop and a resultant white signal thereby is generated. The white signal provided by flip-flop 30 is added to the video signal in adder 40 during the interval when video is blanked by the black signal of flip-flop 24. The resultant image reproduced on kinescope 44 contains either video signals, as received by the television receiver circuitry, or the blanked region in which a white character outlined in black is inserted.

In one example of numerical character generation, the number 6 is selected by the channel address circuitry 10. BCD signals (e.g., 0110) corresponding to the number 6 are provided by channel address register 10 to character segment decoder 12 to activate gates corresponding to the three horizontal lines $H_1$, $H_2$, $H_3$, the left vertical bar (LVB) and the right vertical bar (only one-half of which will be used). Particularly, horizontal bar signals $H_1$, $H_2$ and $H_3$ are gated to output line HB, a full left vertical bar signal generated on the LVB output line and a combined signal formed of an RVB signal logically ANDED with the VLH (vertical lower half) timing signals is generated on the RVB output line. The five signals generated by decoder 12 correspond to the character segments illustrated in FIG. 3A. Horizontal bars provided on line HB are gated within decoder 18 with the $T_1 - T_7$ decode signal (see FIG. 2C), the LVB signal is gated with the $T_1 - T_3$ decode signal (see FIG. 2D) and the RVB·VLH signal gated with the $T_5 - T_7$ decode signal (see FIG. 2F). Signals corresponding to the numeral 6, shown in FIG. 3A, are coupled from decoder 18 to the input of D flip-flop 24 and are delayed by one clock time at the output of this flip-flop.

The white center portion of the numeral in FIG. 3B is formed by coupling signals corresponding to the horizontal bars $H_1$, $H_2$ and $H_3$ via line 36 to white generator 26. The horizontal bar signals are subsequently reduced in height by blanking appropriate portions with modulo 4, line 0 and modulo 4, line 3 signals. The resultant horizontal bar signals after blanking correspond to horizontal bars having a height of two horizontal lines rather than the original four. FIG. 3C illustrates the resultant form of the horizontal bars after modulo 4, line 0 and modulo 4, line 3 signals are combined with the $H_1$, $H_2$ and $H_3$ signals. Vertical bar signals LVB and RVB·VLH are coupled to white generator 26 through line 38 and are combined with the horizontal bar signals which have been blanked with modulo 4, lines 3 and 0 signals. The resultant image produced by the signals from generator 26 is illustrated in FIG. 3D.

To form the inner portion of the numeral (white portion) illustrated in FIG. 3B, the signals from generator 26 are passed through a gate 28. Gate 28 receives additional blanking signals corresponding to scan lines 0 and 19, the top and bottom lines of the numeral 6 of FIG. 3D, and blanks these portions of the total signal. The vertical portions of the signals utilized to generate FIG. 3D are diminished in width by AND gating (in gate 28) the signals of generator 26 with the one clock-time delayed signals utilized to generate FIG. 3A. The resultant signals from gate 28 reproduce the image shown in FIG. 3E. A half clock-time delay is thereafter given to the signals from gate 28 by flip-flop 30 to center the image of FIG. 3E with that of FIG. 3A. Signals provided by flip-flop 24 blank the incoming video signal in blanking generator 42 providing a black digit to kinescope 44 having substantially the same size as that illustrated in FIG. 3A. White video from flip-flop 30 is appropriately added through adder 40 to the region blanked by generator 42 and reproduces an image substantially as shown in FIG. 3B on kinescope 44.

Although specific circuitry for some of the blocks in FIG. 1 has not been illustrated, appropriate logic circuitry for these blocks will be apparent to one skilled in the art.

What is claimed is:

1. Apparatus for generating characters having borders which contrast with the body of said characters and suitable for display on a raster scanned image display device comprising:

means for generating signals to produce on said display device at least two horizontally aligned vertical bars positioned to define the height and width of said character body and borders;

means for generating signals to produce on said display device a number of horizontal bars having length equal to the width of said character body and borders and being vertically displaced with spaces between each, said horizontal bars and spaces having a vertical height equal to the height of said vertical bars;

means for generating character command signals;

bar selecting means responsive to said character command signals for selectively gating ones of said vertical and horizontal bar signals representative of a selected character;

delay means coupled to said bar selecting means for providing a delay to signals provided thereby to control the width of the desired border on said characters;

means for generating blanking signals in timed relationship with the generation of the horizontally disposed borders of said horizontal bars;

gating means having inputs coupled to said delay means and said bar selecting means for providing signals in response to the concurrent presence of signals at said inputs, said gating means also being coupled to said means for generating blanking signals to blank signals provided thereby representative of the horizontally disposed borders of said horizontal and vertical bars in response to said blanking signals;

further delay means coupled to said gating means for providing a predetermined delay to said gated signals; and means for combining signals provided by said delay means and said further delay means wherein said delayed signals correspond to a border for said character and said further delayed signals correspond to a character of different color and smaller size than said border of said character.

2. Apparatus according to claim 1 wherein said delay means provides a delay corresponding substantially to twice the width of the horizontally disposed borders on said characters; and said further delay means provides a delay corresponding substantially to the width of said horizontally disposed borders.

3. Apparatus according to claim 1 wherein said means for generating signals to produce on said display device a number of horizontal bars generates signals to produce on said display device three horizontal bars.

4. Apparatus according to claim 3 wheren said three horizontal bars are vertically displaced with spaces between each equal to the width of one of said horizontal bars.

5. Apparatus according to claim 3 wherein said means for generating signals to produce on said display device at least two vertical bars generates signals to produce on said display device three vertical bars.

6. Apparatus according to claim 5 wherein said three vertical bars are juxtaposed.

* * * * *